US008189018B2

(12) United States Patent
Matsumoto

(10) Patent No.: US 8,189,018 B2
(45) Date of Patent: May 29, 2012

(54) TIME STAMP

(75) Inventor: Satoru Matsumoto, Narashino (JP)

(73) Assignee: SEIKO Precision Inc., Narashino-shi (JP)

( * ) Notice: Subject to any disclaimer, the term of this patent is extended or adjusted under 35 U.S.C. 154(b) by 323 days.

(21) Appl. No.: 12/575,044

(22) Filed: Oct. 7, 2009

(65) Prior Publication Data

US 2010/0085393 A1 Apr. 8, 2010

(30) Foreign Application Priority Data

Oct. 8, 2008 (JP) ................................ 2008-261567

(51) Int. Cl.
*G01D 15/04* (2006.01)
*B41J 3/36* (2006.01)

(52) U.S. Cl. ......................................... 346/80; 347/109

(58) Field of Classification Search .................... 346/80, 346/141, 142; 347/109
See application file for complete search history.

(56) References Cited

U.S. PATENT DOCUMENTS 6,061,303 A * 5/2000 Gauthier et al. ................ 368/10

FOREIGN PATENT DOCUMENTS

JP B-1933-001110 3/1933
JP 5-4284 U 1/1993
JP 9-62883 A 3/1997

OTHER PUBLICATIONS

Japanese Office Action dated Oct. 29, 2010 including English translation (Six (6) pages).
Japanese Office Action dated Oct. 29, 2010 including Elnglish translation (Six (6) pages).

* cited by examiner

*Primary Examiner* — An Do
(74) *Attorney, Agent, or Firm* — Crowell & Moring LLP

(57) ABSTRACT

A time stamp is a device that prints time information on a time card inserted into a time card slot. The time card slot is formed to be inclined downwardly in the depthwise direction of the time stamp at an angle of 8 to 10 degrees or so with the mount surface of the time stamp being a reference. The time stamp has a mount portion to be attached to a wall surface. The time card slot extends in a direction orthogonal to the rear surface of the time stamp.

1 Claim, 4 Drawing Sheets

TIME STAMP

BACKGROUND OF THE INVENTION

1. Field of the Invention

The present invention relates to a time stamp.

2. Description of the Related Art

Unexamined Japanese Utility Model Application KOKAI Publication No. H5-4284 discloses a time stamp having a time card slot provided at the top surface thereof as an example of a time stamp in which a time card is inserted from above.

Unexamined Japanese Patent Application KOKAI Publication No. H9-62883 discloses a time stamp having a time card slot provided at a side surface thereof. This type of time stamp generally has a print head or a print head carriage mechanism disposed at the upper portion there, and a time card slot provided under the print head or the print head carriage mechanism.

Because the time stamp disclosed in Unexamined Japanese Utility Model Application KOKAI Publication No. H5-4284 is configured so that a time card is inserted from above, it is difficult to insert the time card in the time stamp if placed at a high location. This limits the installation location.

The time stamp disclosed in Unexamined Japanese Patent Application KOKAI Publication No. H9-62883 has the time card slot provided under the print head or the print head carriage mechanism, so that if the time stamp is made short, the position of the time card slot becomes low. This makes it difficult for a user to recognize the presence of the time card slot. In addition, the distance between the mount surface of the time stamp and the time card slot becomes smaller, so that fingers holding a time card may contact the mount surface of the time stamp, making the insertion of the time card difficult. To avoid the difficulty, the position of the time card slot may be moved upward. If the position of the print head and the position of the print head carriage mechanism are moved upward accordingly, the time stamp cannot be made compact. Further, when the time card slot is located under the print head or the print head carriage mechanism, information such as a time is printed on a bottom surface of the time card. To check the contents printed on the time card, therefore, the user needs to flip over the time card after pulling it out of the time stamp. This reduces the operability.

SUMMARY OF THE INVENTION

In view of the above situation, it is an object of the present invention to provide a time stamp which facilitates insertion of a time card, and can be made compact.

To overcome the foregoing problems, according to the invention, there is provided a time stamp for printing time information on a time card inserted into a time card slot, wherein the time card slot is formed to be inclined downwardly in a depthwise direction with a mount surface of the time stamp being a reference.

According to the invention, because the time card slot is formed to be inclined downwardly in the depthwise direction with the mount surface of the time stamp being a reference, it is easy to recognize the insertion opening of the time card slot. Because the time card slot is formed to be inclined downward in the depthwise direction, a time card, when inserted into the slot, is inserted so as to be inclined depthwise. That is, the time card is inclined in such a way that its end portion located on the insertion opening side of the time card slot is positioned above the end portion located on the depthwise side of the time card slot. The mount surface of the time stamp is therefore separated from fingers holding the time card by the angle of the inclination, thus making it easier to insert the time card. At the time of inserting a time card into the time card slot, especially, the insertion opening side end portion of the time card is separate from the mount surface, so that a sufficient clearance can be secured between the fingers and the mount surface, thus making it easier to insert the time card.

According to the invention, because the time card slot is formed to be inclined downwardly in the depthwise direction, a print head and a print head carriage mechanism can be disposed above the time card slot with the slot positioned at a lower end portion of the time stamp. Accordingly, the time card slot can be located lower than that in a case where the time card slot extends horizontally. This makes it possible to design the time stamp compact.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A time stamp 11 according to one embodiment of the present invention will be described below with reference to the accompanying drawings.

Figure 1:
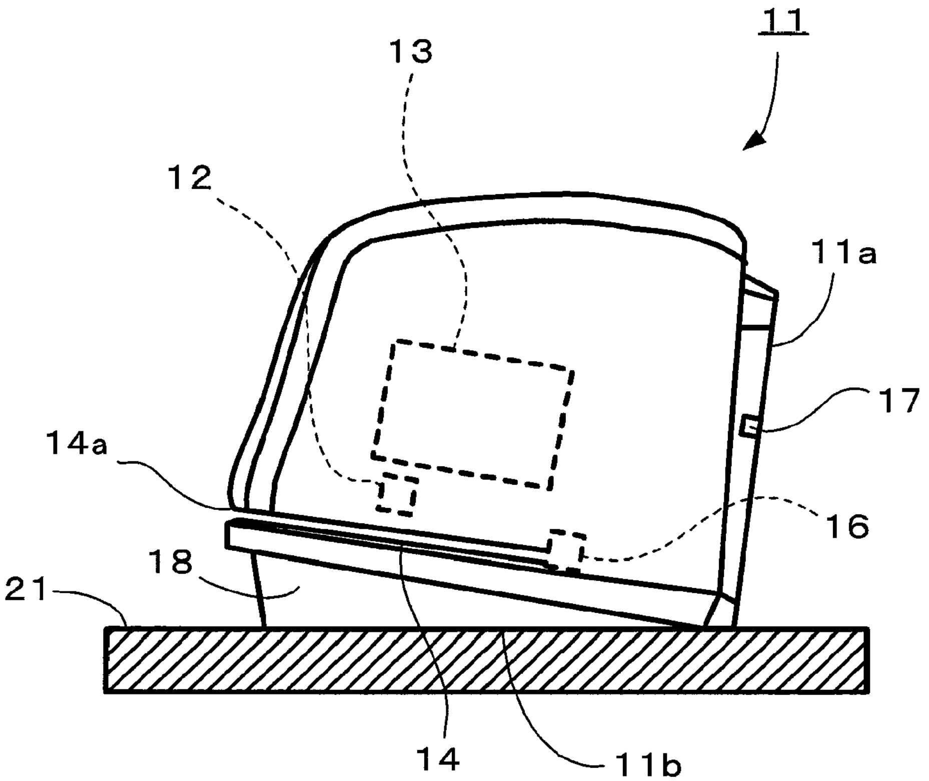
FIG. 1 is a side view of a time stamp according to an embodiment of the present invention.

As shown in FIG. 1, the time stamp 11 has a print head 12 and a print head carriage mechanism 13 including a motor, accommodated in its casing, with a time card slot 14 formed below the print head 12 and the print head carriage mechanism 13.

The time stamp 11 has a base 18 to be mounted on a substantially horizontal mount surface 21.

Figure 2:
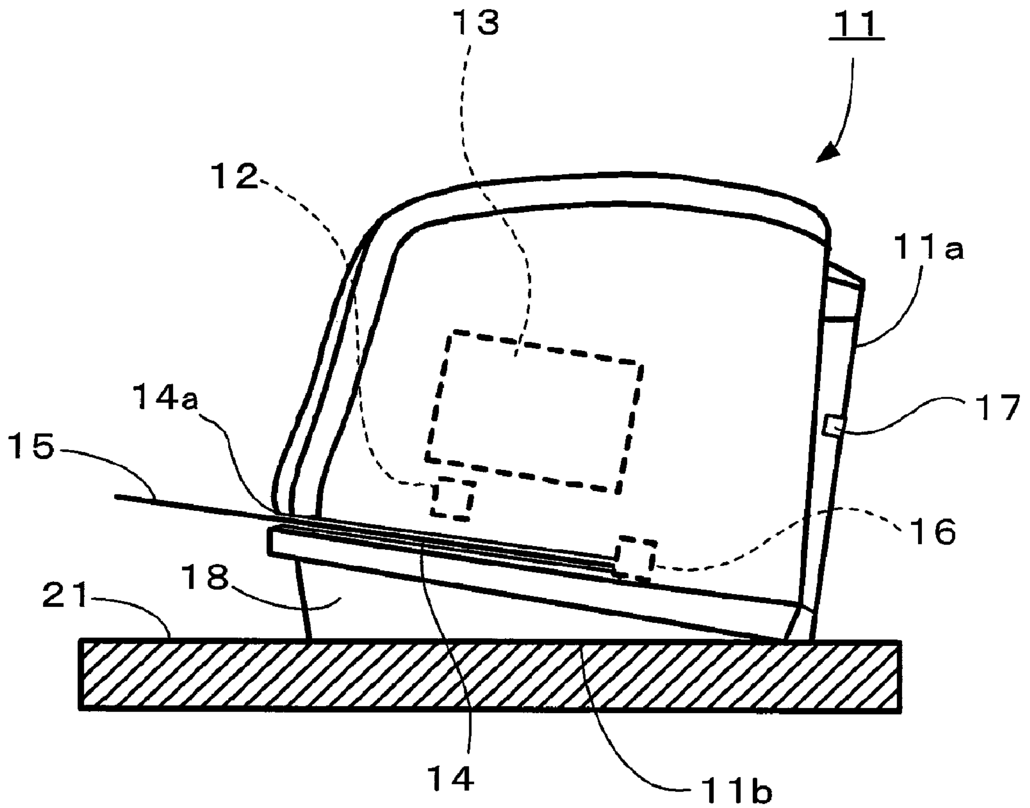
FIG. 2 is a side view of the time stamp with a time card inserted therein.

The time card slot 14 is provided in such a way that a time card 15 is inserted therein from the front side of the time stamp 11 (left side in FIGS. 1 and 2). The time card 15 inserted into the time card slot 14 is detected by a microswitch 16. According to the result of the detection by the microswitch 16, the print head carriage mechanism 13 adjusts the position of the print head 12, which in turn prints time information or the like on the time card 15.

The time card slot 14 is inclined downwardly in the depthwise direction of the time stamp 11 or toward a rear surface 11*a* of the time stamp 11 (rightward in FIGS. 1 and 2).

Figure 3:
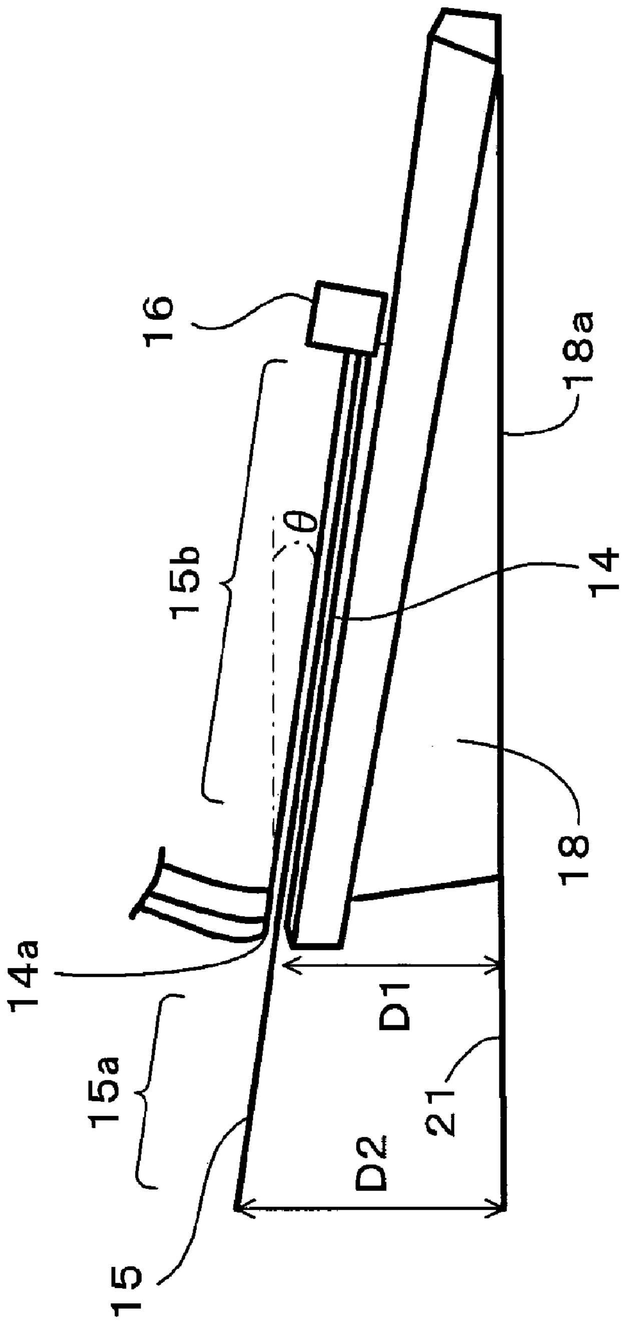
FIG. 3 is an enlarged view of the lower portion of the casing of the time stamp.

Specifically, as shown in FIG. 3, the time card slot 14 has an insertion opening 14*a* provided in such a way that a distance D1 from the mount surface 21 becomes about 33 mm, and is formed to be inclined from the position of the insertion opening 14*a* in the depthwise direction of the time stamp 11 (in the direction of inserting a time card) at an angle θ of about 8 degrees.

With the time card 15 inserted into the time card slot 14, its end portion 15*a* located on the insertion opening 14*a* side protrudes from the insertion opening 14*a* of the time card slot 14 by 10 cm or so.

Holding the end portion 15*a*, a user inserts or withdraws the time card 15. As the time card slot 14 is formed to be inclined in the manner mentioned above, fingers holding the end portion 15*a* are separate from the mount surface 21 by a distance D2 of about 47 mm. This makes it easier to insert or withdraw the time card 15 into or from the time card slot 14.

Figure 4:
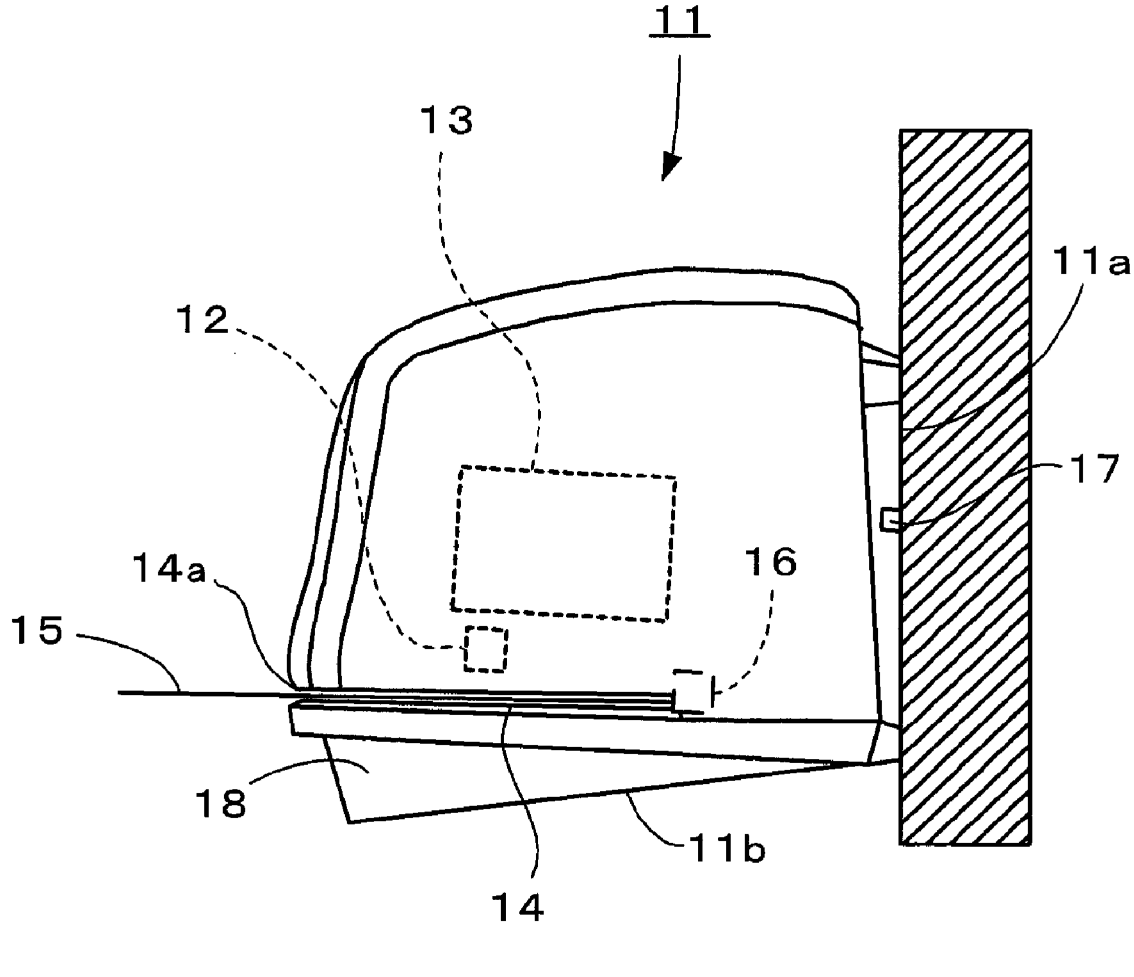
FIG. 4 is a side view showing the time stamp attached to a wall surface.

A mount portion 17 is formed at the rear surface 11*a* of the time stamp 11. The mount portion 17 is comprised of a hook or the like, and is structured in such a way that the time stamp 11 can be attached to a vertical wall surface as shown in FIG. 4.

If the rear surface 11*a* of the time stamp 11 is formed perpendicular to a bottom surface 11*b* of the time stamp 11 (specifically, the bottom surface of the base 18), when the time stamp 11 is attached to the vertical wall surface, the insertion opening 14*a* of the time card slot 14 rises upward, it becomes difficult to insert the time card 15 into the time card slot 14 depending on the attaching position of the time stamp 11. The attaching position of the time stamp 11 is therefore limited.

According to the embodiment, therefore, the structure of the time stamp 11 is designed in such a way that when the time stamp 11 is attached to a vertical wall surface, the time card 15 can be inserted easily.

The rear surface 11*a* (surface which abuts on a wall surface) of the time stamp 11 is inclined by about 8 degrees with respect to the bottom surface 11*b* of the time stamp 11, and is formed substantially perpendicular to the time card slot 14. When the time stamp 11 is attached to a vertical wall surface as shown in FIG. 4, therefore, the rear surface 11*a* extends along the wall surface, so that the time card slot 14 extends horizontally. This increases the degree of freedom of the attaching position of the time stamp 11 as compared with the aforementioned case where the insertion opening 14*a* of the time card slot 14 rises upward.

The time stamp 11 may be attached to a wall surface by means of a magnet or an adhesive as well as a hook.

According to the structure, as the time card slot 14 is formed to be inclined downwardly in the depthwise with the mount surface 21 of the time stamp 11 being a reference, the insertion opening 14*a* of the time card slot 14 easily comes into the view field of the user. Accordingly, the user can easily recognize the insertion opening 14*a*.

As the time card slot 14 is formed to be inclined downwardly in the depthwise direction, the time card 15, when inserted into the time card slot 14, inclines downward in the depthwise direction of the time card slot 14. That is, the time card 15 is inclined in such a way that its end portion 15*a* located on the insertion opening 14*a* side of the time card slot 14 is positioned above an end portion 15*b* located on the depthwise side of the time card slot 14. The mount surface 21 of the time stamp 11 is therefore separated from fingers holding the time card 15 by the angle of the inclination, thus facilitating the handling of the time card 15 and making it easier to insert the time card 15. At the time of inserting the time card 15 into the time card slot 14, especially, the end portion 15*a* of the time card 15 located on the insertion opening 14*a* side of the time card slot 14 is separate from the mount surface 21, so that a sufficient clearance can be secured between the fingers holding the time card 15 and the mount surface 21, thus making it easier to insert the time card 15.

Because the time card slot 14 is formed to be inclined downwardly in the depthwise direction, the print head 12 and the print head carriage mechanism 13 can be disposed above the time card slot 14 with the slot 14 positioned at the lower end portion of the time stamp 11. Accordingly, the time card slot 14 can be located lower than that in a case where the time card slot 14 extends horizontally. Therefore, the time stamp can be made compact.

The inclination angle θ of the time card slot 14 is set to 8 degrees in the foregoing embodiment, which is not restrictive. If the inclination angle θ is too small, fingers holding the time card 15 may unfavorably contact the mount surface 21. If the inclination angle θ is too large, on the other hand, it is difficult to insert the time card 15 and the time stamp 11 becomes large. If the inclination angle θ is too large, the load applied in the case of moving the print head 12 in the lifting direction becomes larger. This demands a larger motor power accordingly, which leads to enlargement of the motor size. This results in enlargement of the time stamp 11. In this respect, it is desirable to set the inclination angle θ of the time card slot 14 equal to 5 degrees or greater and 30 degrees or less with respect to the bottom surface 11*b* (or the mount surface 21) of the time stamp 11. It is more preferable that the time card slot 14 should be set equal to 8 degrees or greater and 10 degrees or less with respect to the bottom surface 11*b* (or the mount surface 21) of the time stamp 11. In this case, it is desirable that the rear surface 11*a* of the time stamp 11 should be formed to be inclined at an angle corresponding to the inclination angle θ in such a way the time card slot 14 becomes substantially horizontal when the rear surface 11*a* of the time stamp 11 (surface abutting on a wall surface when the time stamp 11 is attached to the wall surface) is attached to the wall surface.

From the viewpoint of handling the time card 15, it is desirable to set the distance D2 between the leading end of the time card 15 and the mount surface 21 to 35 mm or greater, preferably, to 45 mm or greater.

The invention is not limited to the foregoing embodiment, and can be modified and applied in various forms.

For example, although the time card slot 14 is provided in such a way that the time card 15 is inserted therein from the front side (left side in FIG. 2) of the time stamp 11 in the embodiment, the time card slot 14 may be structured in such a way that the time card 15 is inserted therein leftward from the right side surface of the time stamp 11 or rightward from the left side surface of the time stamp 11.

The means or the like of installing the time stamp 11 is optional, and a plurality of independent legs may be provided instead of the base 18, or a hole may be provided in place of the mount portion 17, so that a hook provided on a wall surface is engaged with the hole.

The insertion of the time card 15 may be recognized by an optical sensor or the like instead of the microswitch 16.

The structures of the print head 12 and the print head carriage mechanism 13 are optional.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2008-261567 filed on Oct. 8, 2008 and including specification, claims, drawings and summary. The disclosure of the above Japanese Patent Application is incorporated herein by reference in its entirety.

What is claimed is:

1. A time stamp for printing time information on a time card, comprising:

a time card slot configured to receive the time card;

a mount portion attachable to a wall surface, the mount portion being provided at a rear surface of the time stamp;

a bottom surface of the time stamp, the bottom surface being settable on a mount surface;

a print head configured to print on the time card, the print head being disposed above the time card slot relative to the bottom surface; and a print head carriage mechanism which adjusts a position of the print head, the print head carriage mechanism also being disposed above the time card slot, wherein the time card slot is formed to be inclined downwardly in a depthwise direction at an angle of 8 degrees or greater and 10 degrees or less with respect to the bottom surface of the time stamp, the time card slot extending in a direction perpendicular to the rear surface of the time stamp.

* * * * *